Feb. 25, 1947.   L. H. KNIBB   2,416,326
ICE CREAM FREEZER
Filed Nov. 6, 1942   6 Sheets-Sheet 1

INVENTOR.
Leroy H. Knibb
BY
*[signature]* Attorney

Feb. 25, 1947. L. H. KNIBB 2,416,326
ICE CREAM FREEZER
Filed Nov. 6, 1942 6 Sheets-Sheet 2

INVENTOR.
Leroy H. Knibb
BY
*[signature]* ATTORNEY.

Feb. 25, 1947. L. H. KNIBB 2,416,326
ICE CREAM FREEZER
Filed Nov. 6, 1942 6 Sheets-Sheet 4

INVENTOR.
Leroy H Knibb
ATTORNEY.

Feb. 25, 1947.                L. H. KNIBB                2,416,326
                            ICE CREAM FREEZER
                        Filed Nov. 6, 1942           6 Sheets-Sheet 5

INVENTOR.
Leroy H. Knibb
BY
V. M. Holbrook    ATTORNEY.

Patented Feb. 25, 1947

2,416,326

UNITED STATES PATENT OFFICE 2,416,326

ICE-CREAM FREEZER

Leroy H. Knibb, Sabot, Va.

Application November 6, 1942, Serial No. 464,822

15 Claims. (Cl. 62—114)

My invention relates to ice-cream freezers.

It has been the practice of the prior art to produce ice-cream and ices for table use by agitating the ingredients within a container surrounded by ice, normally packed with salt to form a refrigerating brine, the edibles under these conditions, congealing or approaching a solidified condition. This method of freezing cream or other edibles is, however, exceedingly laborious and inconvenient.

With the relatively recent and widespread adoption of automatically operated domestic refrigerators attempts have been made to utilize the cooling effect of such refrigerators as a substitute for the ice and salt of the older process. Various suggestions have been made as to how this should be done, but none of these have been proven of such worth as to result in any substantial commercial success.

In the manufacture of frozen edibles such as ice-cream, it is desirable that the ingredients be agitated while they are being cooled. The purpose of this is to reduce the size of the crystalline structures which are formed as the mixture freezes.

It has been suggested that this stirring of the mixture in refrigerator type freezers be accomplished by the use of electric motor, energized from the refrigerator supply circuit, and further suggestions have involved the attachment of auxiliary motors to the freezer tray to thereby form a unit adapted to be inserted in an ice compartment of the refrigerator. However, such suggestions have apparently failed to realize certain heat exchange difficulties which would be attendant upon such use of motors. In the majority of household refrigerators the cooling compartments, or ice forming chambers, into which the ice cream freezer tray and its driving motor might be placed, are of limited cooling capacity, so limited, in fact, that the heat losses dissipated by the motors, would so burden the refrigerator, that the freezing process would take an excessive length of time.

One of the objects of my invention is to overcome the above indicated difficulty by focusing or localizing the motor heat release at a point remote from the evaporator or ice freezing compartment of the refrigerator, or by otherwise minimizing the transfer of motor developed heat to the tray to be used as an edible freezer.

In one embodiment of my invention, the motor is attached to the freezer tray, and not only thermally insulated therefrom, but it is also under a constant flow of cooled air, which is passed over the motor in a direction away from the freezer container or tray and then discharged at another position remote from the evaporator. This discharge position may be to the atmosphere externally of the refrigerator.

In another embodiment of my invention I locate the motor at a position in the food compartment and remote from the evaporator so that the effect on the edible of the heat developed in the operation of the motor is reduced to a minimum.

My invention also involves a novel dasher mechanism operating with a minimum of power and preventing the development of undesirable grain structures in the frozen edible.

Another object of my invention is to so associate the dasher mechanism with its driving unit that the combination may be readily located in operative position on the freezer tray, securely held in that position during operation, and yet easily and quickly detachable from the tray after the edible has been frozen.

Another object of my invention is to accomplish the above objects without the employment of a cover for the tray, this arrangement permitting inspection of the edible at any stage in the freezing process.

My invention also involves a power transmission unit which permits the driving motor to be readily moved from one position to the other in the refrigerator food compartment without disrupting in any way the transmission of power from the motor to the dasher.

My invention will be more fully set forth in the following description, which refers to the accompanying drawings. The stated novelty, which characterizes my invention will, in compliance with the Revised Statutes (and more particularly Sec. 4888 R. S.), be particularly pointed out in the claims annexed hereto and which form a part of this specification.

The accompanying drawings disclose preferred embodiments of the invention.

In the drawings.

My invention is concerned with freezing units in which certain edibles may be prepared by temporarily placing the units in a domestic refrigerator. The illustrative freezing units may be temporarily placed in the space occupied by one of the refrigerator ice trays, connected to a separate source of power, and then put into operation with a dasher mechanism acting upon the edible, without undesirable interference with the normal functioning of the refrigerator.

Figure 1:
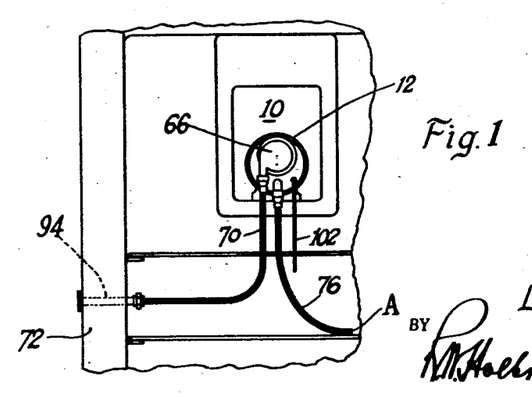
Fig. 1 is a partial front elevation of a domestic refrigerator unit such as that indicated in Fig. 2 with one of my inventive embodiments incorporated therein and disposed in operative position within the refrigerator.
Figure 2:
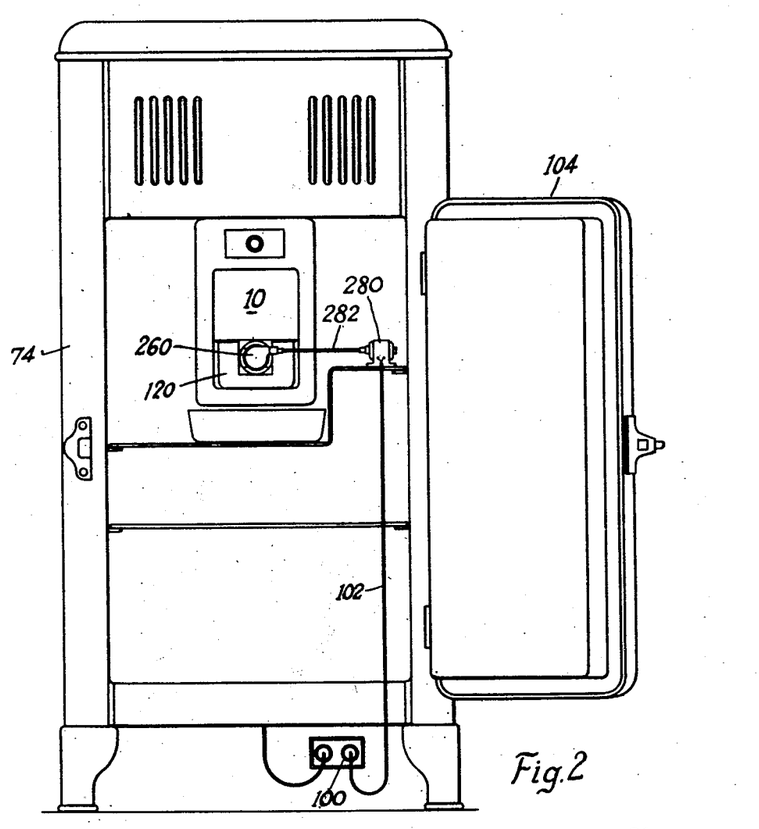
Fig. 2 is a front elevation of such a refrigeration unit as that indicated in Fig. 1, but showing another embodiment of my invention associated therewith.
Figures 3, 4, 5:
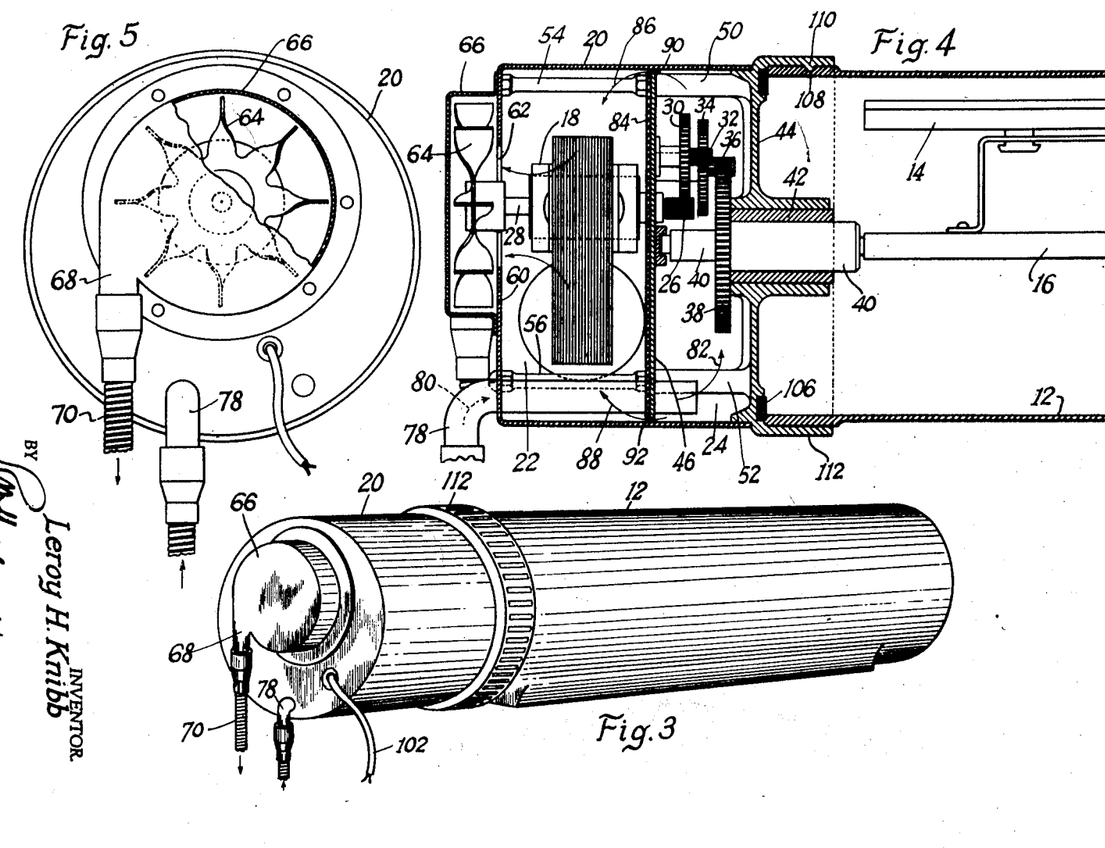
Fig. 3 is a perspective view of one embodiment of my invention. This view shows an ice cream freezing unit in such a position that it can be disposed in one of the tray spaces of a domestic refrigerator.
Fig. 4 is mainly a longitudinal vertical section through a part of the unit indicated in Fig. 3. This figure shows the relationship of the dasher operating mechanism and other components of the system for preventing excessive transmission of heat from the driving motor to the container in which is disposed the edible to be frozen.
Fig. 5 is an end elevation of the unit indicated in Figs. 3 and 4, with a part of the casing broken away.

Fig. 1 of the drawings illustrates a domestic refrigerator with the Fig. 3 embodiment of my invention in operative position in the refrigerator ice compartment 10. This unit, as illustrated more particularly in Figs. 4 and 5 of the drawings, includes an edible container 12 in which a dasher mechanism 14 is operatively disposed. This dasher mechanism includes a rotatable shaft 16 journaled in the front and back walls of the container 12 and driven by an electric motor 18. The motor is preferably disposed within a casing 20, the rear wall of which acts as a fluid-tight cover, closing one end of the container.

The casing 20 is divided into a motor compartment 22 and a second compartment 24 for the reduction gearing. This gearing includes a driving pinion 26 fixed to the motor shaft 28 and meshing with a driven gear 30 of much larger diameter. Mounted coaxially with, and fixed for rotation with, the gear 30, is the second pinion 32 meshing, in turn, with a driven gear 34 of larger diameter which causes the rotation of a third pinion 36, the latter preferably meshes with and drives a large diameter gear 38 fixed to a socket stub shaft 40. The latter is journalled in a bearing 42 mounted in the inner wall 44 of the casing 20, this wall acting directly as the closure, or cover, for the edible container 12.

The motor shaft 28 extends through the partition 46 dividing the compartments 22 and 24. This partition also acts as a support for the pinion and gears 32—36, and for the one end of the socket shaft 40.

The partition 46 is preferably annular in form and is of such a diameter that its perimeter is spaced from the circular wall of the casing 20, as particularly indicated in Fig. 4 of the drawings. The partition is preferably rigidly held in the position shown by parallel supports 50 and 52 and other supports 54 and 56 aligned with and secured to the supports 50 and 52. The latter are preferably rigid with the cover 44 and this entire cover unit including the supports 50 and 52 (at least 3 in number) may be formed as a single casting. Thus after the partition is mounted in its operative position upon reduced end extensions or studs formed on the supports 50 and 52 the screw threaded supports 54 and 56 may then be tightened against the partition by the interengagement of complementary screw threaded portions with the supports 50 and 52.

Thereafter the outer, and cup shaped part of the casing may be placed in position over the ends of the supports 54 and 56, and screw-threaded elements tightened against the cup shaped cover by inter-engagement with the complementary screw threaded parts of the supports 54 and 56.

The motor shaft 28 extends through the face plate 60 of the cup-shaped cover, an opening 62 being provided for the purpose.

Exteriorly of the face plate 60, there is disposed a fan 64 fixed upon the motor shaft 28 and rotating within the housing 66 secured to the face plate 60. This housing is formed with a tangential outlet 68 communicating with a flexible conduit 70 which leads through a wall 72 of the refrigerator as indicated at 94 in Fig. 1 of the drawings.

Extending from a position "A" (see Fig. 1), exteriorly of the refrigerator ice compartment 10 and disposed within the refrigerator food compartment is a flexible conduit 76 leading to a fixed tube or conduit 78 secured to the casing 20 and extending through openings in the face plate 60 and the partition 46, as indicated in Fig. 4 of the drawings.

Thus, in the operation of the embodiment illustrated in Figs. 2, 3, 4 and 5 of the drawings, the fan 64 induces a flow of air from the food compartment of the refrigerator directly to the gear compartment of the unit. Such flow of air is indicated by the arrows 80 and 82. In this mode of operation cool air is first led to a position between the motor 18 and the freezing edible in the container 12, the presence of the cooled air at this position supplementing the insulating effect of the partition stratum 84 in preventing motor developed heat from interfering with the freezing edible. In addition, the gearing compartment receives cool air by reason of the air flow system, the flow of air from the compartment 24 being distributed around the partition 46. Such flow is indicated by the arrows 86 and 88, the circumferential openings 90 and 92 for this flow having such a distributed flow area, so proportioned to the flow area of the conduit 78 that the cool air from the compartment 24 enters the motor compartment uniformly about the partition.

From the openings 90 and 92 the cool air flows across the motor surfaces and through the motor compartment to the opening 62 and thence through the fan housing 66 and its tangential outlet 68; from that position it may be discharged through the wall 72 of the refrigerator by a fixed tubular section 94 which may remain in position in the refrigerator wall, the opening provided by this tubular section being normally closed when the illustrative freezing unit is not being used. It is within the scope of the above described embodiment of my invention that the air intake "A" may be disposed at one level in the refrigerator food compartment and that the air outlet of conduit 70 be disposed at another level in the food compartment.

The motor 18 is connected to a power outlet 100 by a lead 102 of such a character that it will not interfere with the proper closing of the refrigerator door 104.

The embodiment of my invention above described also includes a gasket 106 preferably secured in an annular recess in the cover 44, as indicated in Fig. 4 of the drawings. This gasket contacts with the end of the container 12 and may be tightly held thereagainst by inter-engagement of locking elements 108 and 110, formed respectively on the container and the flange 112 of the cover 44.

Mechanism may be employed for automatically discontinuing the operation of the motor and effecting the disconnection of the flow of power thereto by reason of the increased resistance of the congealed edible to the rotation of the dasher mechanism 16.

Figure 6:
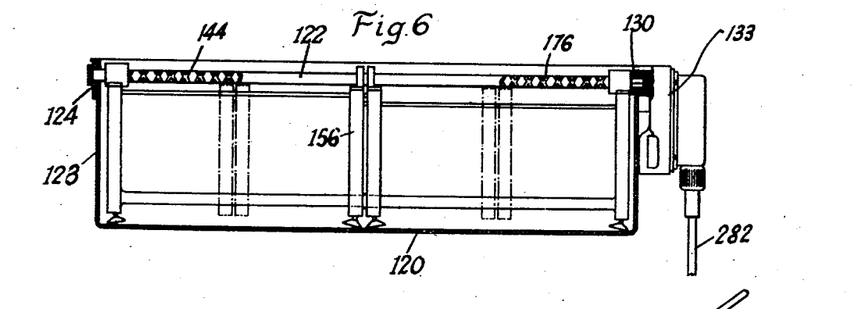
Fig. 6 is a longitudinal vertical section through an embodiment of my invention involving the dasher mechanism, its operating mechanism, and its association with a standard refrigerator tray.
Figure 7:
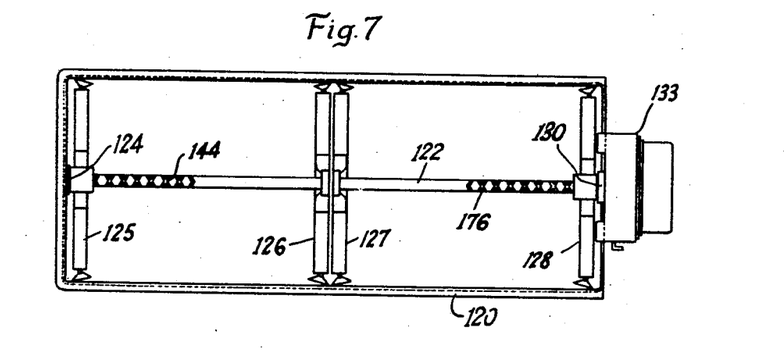
Fig. 7 is a plan of the inventive embodiment shown in Fig. 6.

The embodiment of my invention as illustrated in Figs. 7–16 inclusive in the drawings, includes a reciprocating dasher mechanism which is adapted to be removably set in a refrigerator tray 120, forming the container for the edible to be frozen. The dasher mechanism as particularly illustrated in Figs. 6, 7 and 12, includes an operating shaft 122 which is journalled in a bearing 124 fixed to the rear wall 123 of the tray container 120, the shaft being journalled at its other end by reason of the reception of the squared end 129 of the shaft in a complementary rotatably mounted driving socket member 130 of the power transmission unit 133, to be described in detail below.

The shaft 122 not only reciprocates the dasher frames 125—128 (see Fig. 12) but it also acts as a support for those frames, to maintain them in their operative relationships during all of the reciprocating movements. In functioning in this manner the shaft cooperates with the two distinct dasher frame units 131 and 132. The latter includes the frames 125 and 127 rigidly joined by a lower bar 134 set with its long transverse axis in a vertical plane, and the upper bar 136 which is set with its longer transverse axis in a horizontal plane. The bars 134 and 136 are rigidly secured to intermediate struts 138 and 140, which are fixed parts of the frames 125 and 127. As shown, the bar 134 is secured to the lower end of struts 138 and 140 and the bar 136 is secured at the upper ends of those struts directly below the shaft 122.

The frames 125 and 127 are also rigidified by the bearing members 141 and 142 which extend along the tops of the frames and are rigidly secured thereto at positions adjacent the top portions of the struts 138 and 140. One of these bearings, 142, is constructed so as to act as a housing for an operator key held in position within the bearing member 142 and disposed so that its inner end rides with facility in the groove of a double thread or reversible dasher operating groove 144, formed in the right hand part of the shaft 122. This arrangement of elements causes the dasher units 131 and 132 to be automatically reciprocated so that each frame component, such as 125 with its bottom scraper 150 and its side wall scrapers 152 and 154 moves from a position closely adjacent the rear wall 123 of the container 120 to a position indicated at 156 in Fig. 6 of the drawings.

The upper portion of 160 of the strut 140 is formed with an opening to freely receive the upper bar 162 of the sub-frame or scraper unit 131, this bar corresponding in design and arrangement to the bar 136 of the scraper unit 132. It is secured at one end to the top of the strut 164 of the frame 128 and at its other end to the top portion of the strut 168 of the frame 126, and the portion 166 is formed with an opening through which the bar 136 may be free to slide. Similarly, the lower bar 170 of the scraper frame unit 131 is secured to the lower end of the strut 164 of the frame 128 at one end, and at its other end, is secured to the lower end of the strut 168 of the frame 126.

The frames 126 and 128 are provided with bearings 171 and 172, the former of which has an operator key disposed beneath the plug 174 and has its inner end disposed within the double reversing groove 176 so as to transmit reciprocating motion to the scraper frame unit 131 by the continuous rotation of the shaft 122.

Figure 10:
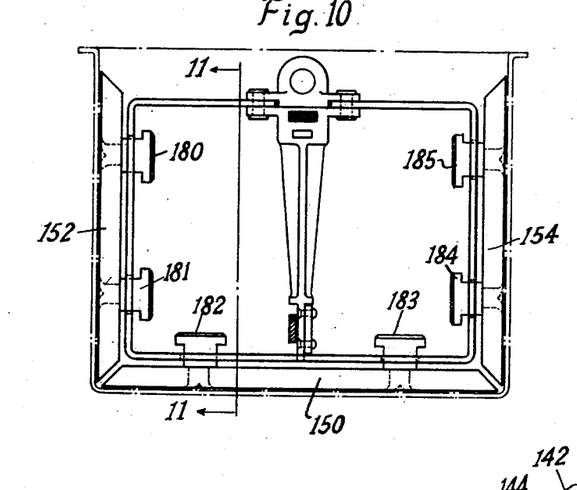
Fig. 10 is an enlarged detail view of the dasher mechanism involved in the Fig. 6 embodiment. This view is in the nature of a transverse vertical section of Fig. 6.
Figure 11:
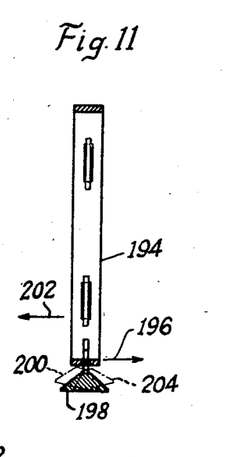
Fig. 11 is a transverse section on the line 11—11 of Fig. 10, and looking in the direction of the arrows.
Figure 12:
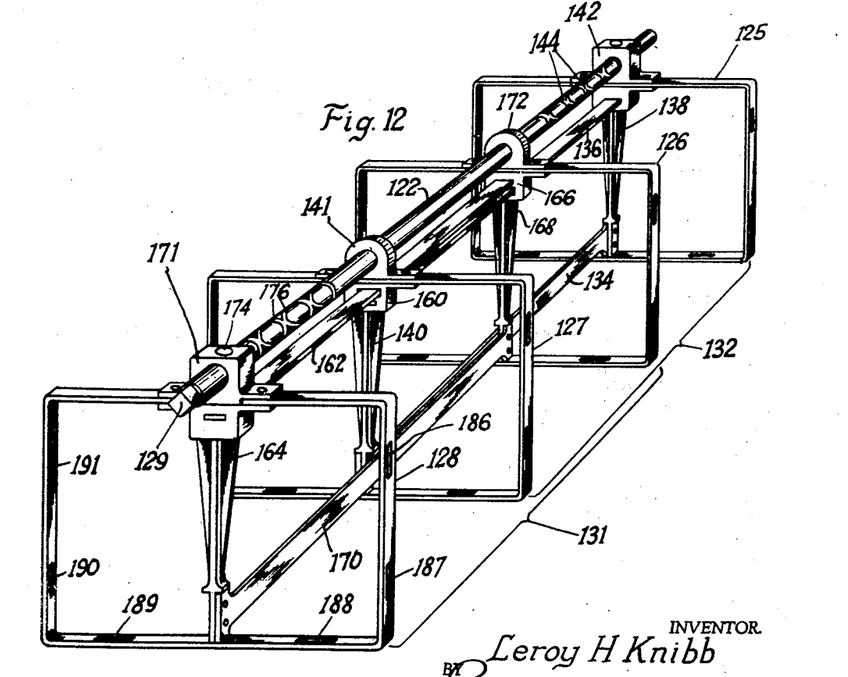
Fig. 12 is a perspective view of the majority of the parts of the dasher mechanism included in that embodiment of my invention which is illustrated in Figs. 6 and 7.

The scraper frames 125—128 have wall and bottom scrapers 150, 152, and 154, loosely secured thereto as indicated in Figs. 10 and 11 of the drawings.

In the preferred embodiment, the scraper elements are preferably made of wood and they are rigid with headed studs 180—185 which extend through openings 186—191 in the bottom and side parts of the frames 125—128. These openings are formed so that they are larger than the stud necks so as to allow the scraper elements to swing from one operative position when the scraper frame is moving in one direction, to another operative position when the scraper frame is moving reversely. This mode of operation may be considered as indicated in Fig. 11 of the drawings. When the frame element 194 is moving in the direction of the arrow 196 the scraper element 198 takes the dotted line position 200 so that its forward edge closely contacts the adjacent wall or bottom of the container 120 and separates all adhering edible from that surface. When the scraper element 194 moves reversely, or in the direction of the arrow 202, the element 198 reverses its position and moves to the dotted line position 204, causing a similar scraping action during the reverse movement. It will be understood that all scraper frames 125—128, are equipped with scraper element similar to that shown at 198.

Figure 9:
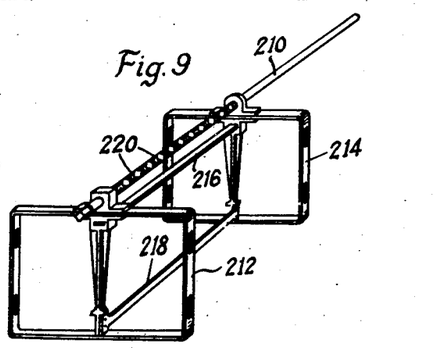
Fig. 9 is a detail view of another embodiment of the dasher mechanism shown in perspective.

The embodiment of the scraper mechanism illustrated in Fig. 9 of the drawings includes a shaft 210 with a single scraper frame thereon. This frame includes the frame elements 212 and 214 connected by the upper and lower bars 216 and 218 and otherwise constructed in a manner similar to the manner of construction of the scraper frames 131 and 132 of the Fig. 12 drawings. In the embodiment shown in Fig. 9, the shaft 210 is formed with only one set of the reversible grooves or threads 220. The threaded portion of the shaft is approximately equal to half of the length of the container 120 and the distance between the scraper frames 212 and 214 is also of a similar length.

Figures 13, 14, 15, 16:
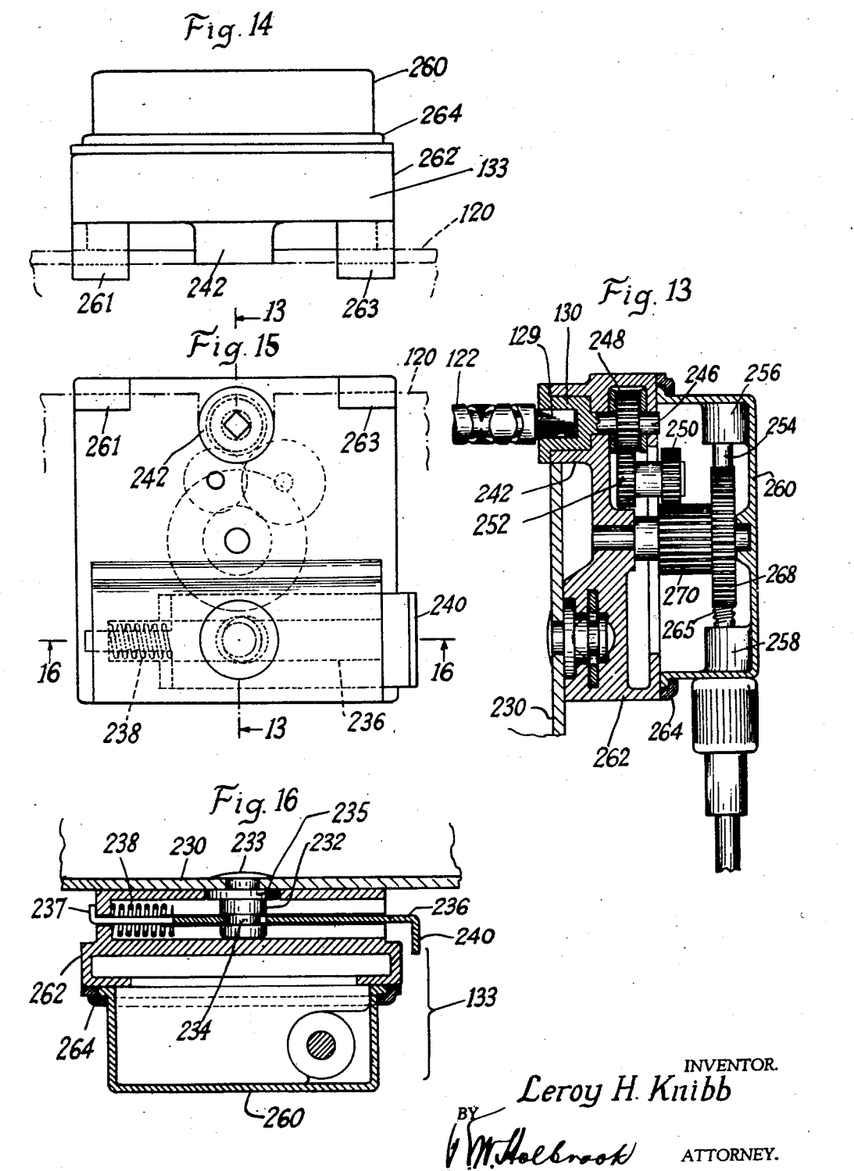
Fig. 13 is a vertical section (on the line 13—13 of Fig. 15) of the power transmission unit which is involved in the Fig. 6 embodiment.
Fig. 14 is a plan of the power transmission unit shown in Fig. 13.
Fig. 15 is a rear elevation of the Fig. 13 power transmission unit showing the relative positions of some of the gearing components in dotted lines, and disclosing the relationship of some of the parts of the mechanism by which the power transmission unit is locked in its operative position upon the refrigerator tray.
Fig. 16 is a horizontal transverse section on the plane indicated by the section line 16—16 of Fig. 15.
Figure 17:
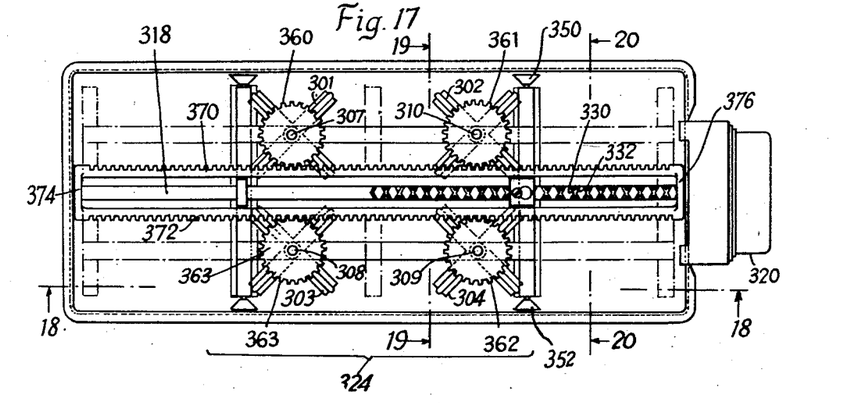
Fig. 17 is a plan of a freezing unit in which a plurality of rotating dashers are mounted upon a frame which reciprocates within a freezing tray.

As indicated in Figs. 13 and 16 of the drawings the front wall 230 of the container 120 is formed with a locking stud 232 rigidly secured thereto, and presenting an annular groove 234 for the reception of a slidable locking member 236. This stud also receives the front wall of the container 230 between its head 233 and a flange 235. This locking member is housed within and carried by a power unit 133 as indicated in Figs. 13 and 16 and it is biased by the spring 238 to its locking position wherein a part of the member 236 is disposed within the groove 234 and the stop 237 contacts the base plate 262. The power unit is released by pressure upon the release plate 240 formed at the right hand end of the member 236.

When the power unit 133 is to be disposed upon the wall 230 of the tray the annular boss 242 is dropped within a recess in the wall 230 and with the power unit base plate top lugs or hooks 261 and 263 hooked over the top of the front wall of the tray 120 the entire power unit is pressed toward the wall 230 until the lock 236 snaps into locking position in the groove 234.

The power socket 130 is rotatable within the boss 242 and journalled therein. It has fixed on its extension 246 a pinion 248 meshing with a gear train (including the gears 250 and 252) which transmits power from a motor shaft connected with a worm 265 journalled in the studs 256 and 258 which form part of a freely swingable casing 260 centered upon the power unit base plate 262 and permitted to have free swinging motion relative thereto by the annular retaining member 264 which is secured to the base plate 262. The worm 265 on the power shaft 254 meshes with the worm wheel 268 which is nonrotatively associated with the pinion 270 mounted for rotation centrally of the casing 260 and the base plate 262.

Figure 8:
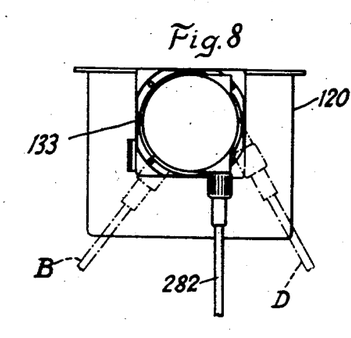
Fig. 8 is an end elevation of the Fig. 6 embodiment, illustrating the different positions to which the operating shaft may be moved for the purpose of enabling the driving motor to be disposed at different locations in the refrigerator, without interfering, in the least, with the operation of the invention.

This construction permits the location of the motor 280 at different positions within the food compartment of the refrigerator, the flexible shaft 282, connected to the worm shaft 254 swinging from the dotted line position "B" (see Fig. 8) to the dotted line position "D," or to any intermediate position.

The freezing unit indicated in Figs. 17-20 of the drawings includes a plurality of dashers 301—304 fixed to the vertical shafts 307—310 which are journaled in a reciprocating frame 315. This frame is supported and guided by a driven shaft 318 operably connected to the detachable power unit 320 and rotatably supported at its rear end by the tray 322.

Figure 20:
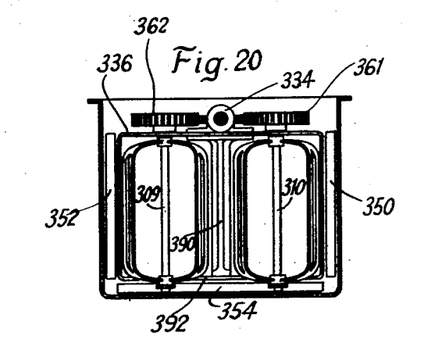
Fig. 20 is a transverse vertical section on the line 20—20 of Fig. 17.
Figure 21:
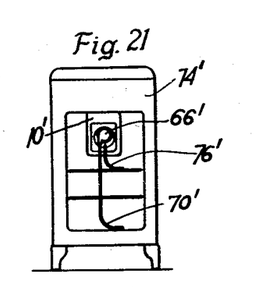
Fig. 21 is an elevation of a refrigerator with a specific arrangement of the freezer air inlet and outlet.

The end of the operating shaft 318 nearest the power unit is provided with oppositely formed helical threads or operating grooves 330—332 for reciprocating the frame 315 as the shaft 318 rotates. This part of the shaft 318 extends through a bearing 334 provided with an operating pin or key which fits into the grooves 330—332. The bearing 334 is fixed to the upper horizontal member 336 of the frame 315, as indicated in Fig. 20 of the drawings.

Figure 19:
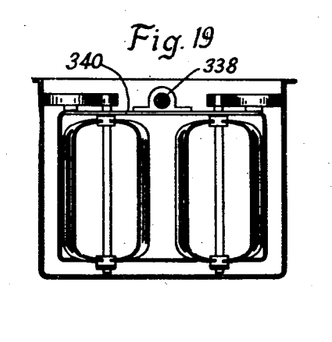
Fig. 19 is a transverse vertical section on the line 19—19 of Fig. 17.

The other end of the frame 315 is supported by the bearing 338 secured to the frame member 340, as indicated by Fig. 19.

The frame members 336—340 are parts of the upright frame end sections 342—344. These sections are preferably rectangular in outline, as indicated in Figs. 19-20 and they have loosely mounted on their upright and bottom parts the side scrapers 350—352, and the bottom scrapers 354. The scrapers are constructed in a manner similar to those described above and they operate in a reversing manner to scrape the bottom and side walls of the tray as the dasher unit reciprocates.

The upper ends of the vertical shafts 307—310 have fixed thereon the spur gears 360—363, and the teeth of these gears meshed with the teeth on the racks 370—372. These racks are formed as parts of a single casting having end portions 374—376 with openings receiving the ends of the shaft 318. The racks are thus rigidly secured in operative position so that as the frame 315 is reciprocated the dashers 301—304 will be rotated in one direction as the frame moves toward the left, and in the opposite direction when the frame moves to the right.

Figure 18:
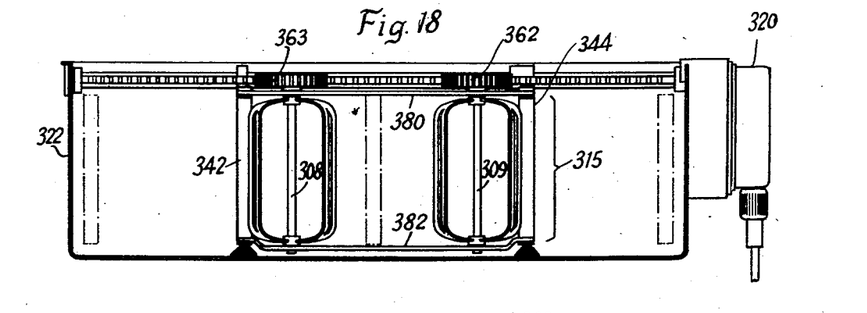
Fig. 18 is a vertical section through the Fig. 17 freezing unit, on the section line 18—18 of Fig. 17.

The vertical dasher shafts 307—310 are mounted in the upper and lower reciprocating frame bars 380 and 382, as indicated in Fig. 18, and the reciprocating frame is rigidified by centrally arranged struts 390. These struts are rigidly secured to the upper frame members 336 at their upper ends, and similarly, the lower ends of the struts are rigidly secured to the lower frame members 392.

Whereas, in accordance with the Revised Statutes applicable thereto, and more particularly Sec. 4888 R. S., I have described my invention with reference to certain preferred embodiments thereof. I do not wish that my invention be limited to all of the details described. It is rather to be taken as of a scope commensurate with the subjoined claims.

I claim as my invention:

1. In an ice cream freezer adapted to be inserted into the ice compartment of a refrigerator, a container for an edible to be frozen, a driving motor attached to said container, a housing enclosing the motor, a fan within the housing, a tube or conduit leading from a position within the food compartment of the refrigerator to the housing on the intake side of the fan, means whereby the intake side of the fan is in communication with a portion of the housing adjacent the container so that the air impelled by the fan will flow from that position away from the freezer and toward the motor, and a conduit or tube leading from the housing at a position remote from the container and constructed and arranged to discharge the motor heated air through the refrigerator wall to the atmosphere.

2. In combination with a domestic refrigerator having an ice making compartment and a power circuit associated therewith, an ice-cream freezer adapted to be inserted into said compartment, said freezer comprising a freezing container, a motor attached to the container, a housing, a fan within the housing, means for connecting the housing on the intake side of the fan to a position in the food compartment of the refrigerator remote from the ice making compartment, means for causing the air from the food compartment to move within the housing from a position adjacent the container over the motor and then out of the housing in a direction away from the container, and means connecting the housing on the discharge side of the fan to the atmosphere.

3. In a refrigerator freezing unit, an edible container, a dasher therein, a motor within a housing attached to the container, a train of transmission gearing connecting the motor and the dasher and disposed in a casing positioned intermediate the container and the motor, means for admitting cooled air directly to the gear casing without passing through the motor housing, and means for causing the air in the gear casing to pass to and through the housing to a point exteriorly of the refrigerator freezing unit.

4. In a refrigerator ice cream freezer, an edible container fitting an ice tray space, a dasher mechanism operable within the container to scrape the sides thereof free of frozen edible, a driving unit detachably secured to the container and operatively connected to the dasher mechanism, a motor within the refrigerator food compartment, and a shaft connecting the motor and the driving unit, the shaft being connected to the driving unit by a rotatable connector permitting the motor to be moved to a different position in the refrigerator food compartment.

5. An ice cream freezer comprising a tray shaped container adapted to be inserted in the tray space of a domestic refrigerator, agitating and wall scraping means for the container limited to positions adjacent the walls and bottom of the container, means for rigidifying said agitating and scraping means so that the latter may be simultaneously guided with respect to the walls of the container and reciprocated within the container, a motor remote from the ice compartment of the refrigerator for operating the agitating and scraping means, a power transmission unit, means for releasably locking the power transmission unit to the container, a flexible shaft connecting the motor and power transmission unit, and a detachable connector between the agitating and scraping means and the power transmission unit, said flexible shaft being secured to the power transmission unit by a mechanism a part of which is easily swingable with respect to the power transmission unit when the latter is attached to the container.

6. In a refrigerator freezer unit, an edible container adapted to fit in an ice tray space, a dasher mechanism in the container, a motor for operating the dasher, a motor housing, a gear casing interposed relative to the container and the motor housing to enclose an air space acting as a heat insulating medium at that position, and means for causing a constant flow of cooled air through the gear casing.

7. In a refrigerator freezing unit, an edible container, a dasher therein, a motor housing, a train of transmission gearing connecting the motor and the dasher and disposed in a casing positioned intermediate the container and the motor, means for admitting cooled air directly to the gear casing without passing through the motor housing, and means for causing the air in the gear casing to pass to and through the housing to a point exteriorly of the refrigerator freezing unit.

8. An ice cream freezer comprising a tray shaped container adapted to be inserted in the tray space of a domestic refrigerator, agitating and scraping means in the container including open frames mainly limited to positions adjacent the walls and bottom of the container and presenting a minimum of structure to pass through the edible body within the container, means for operating the frames of said agitating and scraping means so that they are simultaneously guided with respect to the walls of the container while reciprocated within the container, a motor remote from the ice compartment of the refrigerator for operating the agitating and scraping means, a power transmission unit detachably secured to the container, means for releasably locking the power transmission unit to the container, and a flexible shaft connecting the motor and power transmission unit, the power transmission unit having means forming a detachable driving connection between the agitating and scraping means and the power transmission unit, said flexible shaft being secured to the power transmission unit by a mechanism a part of which is easily swingable with respect to the remainder of the power transmission unit when the latter is in position on the container.

9. In a refrigerator freezing unit, an edible container, a dasher therein, a motor within a housing attached to the container, a casing positioned intermediate the container and the motor, means for admitting cooled air directly to the casing without passing through the motor housing, and means for causing cooled air to pass from the casing to and through the housing to a point exteriorly of the refrigerator freezing unit.

10. In combination with an electric refrigerator having evaporator and food compartments, a dasher contained in a tray adapted to fit in an ice tray space of the evaporator, a motor mounted on the tray for operating the dasher, means for constantly replenishing a body of cooled air in an enclosure between the tray and the motor, and means conducting cool air from said enclosure over the motor and thence to an outlet externally of the refrigerator evaporator.

11. In an ice cream freezer; a container for positioning in the ice tray space of a refrigerator evaporator unit; a dasher operable within the container; an electric motor, a fan driven thereby, power transmission mechanism operatively connecting the motor and the dasher to drive the latter, all secured to the container to form a unit therewith; a casing having one part enclosing the motor and a second part adjacent the container and enclosing the power transmission mechanism, the casing having an air inlet connection leading from the exterior of the freezer to said second part of the casing, a fan housing secured to the casing with the motor disposed between the fan and the power transmission, there being a fan inlet opening leading from the casing into said housing, and a fan outlet connection leading from said housing to a position exteriorly of the freezer.

12. In a refrigerator freezing unit, a dasher frame adapted to be detachably supported within a freezing tray, a rotatable dasher carried with the frame, means for reciprocating the frame from one end of the tray to the other, means causing the dasher to be rotated when the frame moves longitudinally of the tray, said dasher being so constructed and arranged that it acts upon substantially all of the body of edible as the frame is reciprocated, reversely operable tray scrapers carried by the frame and arranged to scrape the side walls and bottom of the tray as the frame reciprocates, and a power unit adapted to be operably connected to the tray for reciprocating the frame.

13. In apparatus for preparing frozen edible; a container adapted to fit in a refrigerator ice tray chamber, traversing means normally movable back and forth from one end of the container to the other, said means including reversing container wall scrapers and beaters, the beaters rotating in the container during their back and forth movement, said means also including a rotatable mounting for the beaters, means mounting the scrapers and the beaters for reciprocating movement, means causing the beaters and the scrapers to reciprocate in the container, and means causing the beaters to be rotated on their own axes as they are reciprocated.

14. In a refrigerator ice cream freezer, an edible container positioned in the freezing unit of the refrigerator, a dasher mechanism operable within the container to scrape the sides thereof free of frozen edible, a driving unit detachably secured to the container and operatively connected to the dasher mechanism, a motor remote from the freezing unit, and a shaft connecting the motor and the driving unit, the driving unit including mechanism directly connected to the shaft and turnably mounted relative to the remainder of the driving unit to permit the shaft to swing from one motor position to another.

15. In a dasher mechanism; a freezer container having a bottom and side walls; a first unit consisting of a plurality of open dasher frames having side and bottom elements adapted to extend parallel to the side walls and bottom of the freezer container, a second unit similar to the first with a frame of the second unit positioned between the frames of the first unit, said frames being formed with bearing openings, means including an operating shaft and separate sets of bars or rods with each set rigidly connecting the frame of its respective unit for maintaining said frames in parallelism, and means operating said shaft, said shaft extending through said bearing openings of the frames of both units and each set of said bars or rods being slidably related between their ends to the frame of the other unit.

LEROY H. KNIBB.

REFERENCES CITED

The following references are of record in the file of this patent:

UNITED STATES PATENTS

| Number | Name | Date |
|---|---|---|
| 2,020,946 | Jordan | Nov. 12, 1935 |
| 1,973,797 | Coulbourn | Sept. 18, 1934 |
| 1,956,322 | Grant | Apr. 24, 1934 |
| 1,885,139 | Porter | Nov. 1, 1932 |
| 1,977,548 | Frenning | Oct. 16, 1934 |